Oct. 7, 1958        H. W. GOARD        2,855,448
TREATMENT OF METAL HALIDE SLUDGES
Filed Aug. 22, 1955
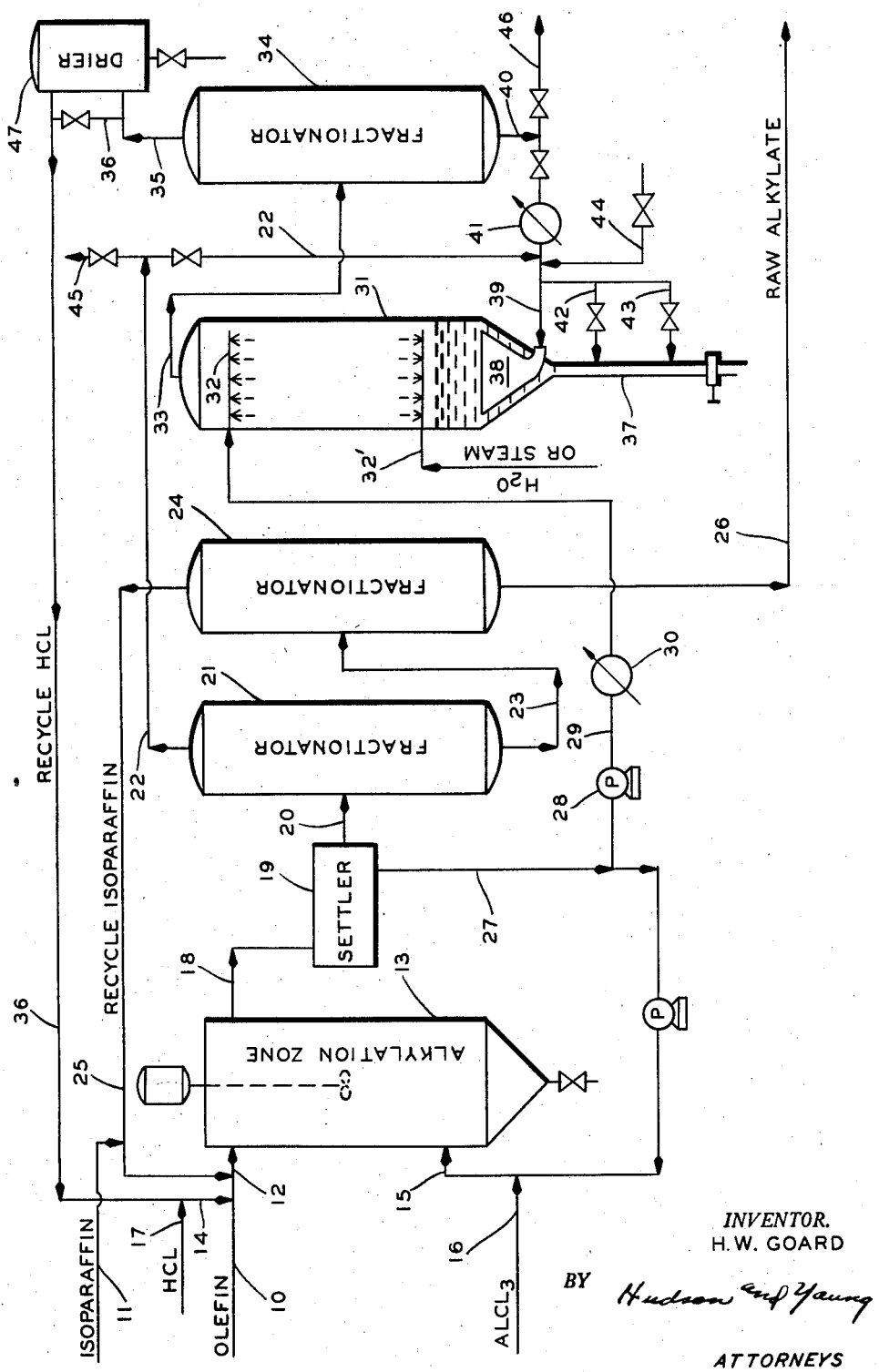
INVENTOR.
H. W. GOARD
BY Hudson and Young
ATTORNEYS

United States Patent Office 2,855,448
Patented Oct. 7, 1958

2,855,448

TREATMENT OF METAL HALIDE SLUDGES

Howard W. Goard, Bartlesville, Okla., assignor to Phillips Petroleum Company, a corporation of Delaware Application August 22, 1955, Serial No. 529,888

8 Claims. (Cl. 260—683.57)

This invention relates to the treatment of metal halide sludes to recover valuable components thereof. In one aspect this invention relates to the production of hydrogen halides. In another aspect this invention relates to the disposal of metal halide sludges formed during the catalytic conversion of hydrocarbons in the presence of metal halide catalysts.

Of great commercial interest at the present time are the isomerization and alkylation of low-boiling hydrocarbons, particularly members of the paraffin series such as the butanes, pentanes and hexanes. In these reactions a simple chemical change is effected under relatively mild conditions. In the case of isomerization a change in carbon skeleton without change in number of carbon atoms occurs, and in the case of alkylation the direct union of two molecules, such as an isoparaffin and an olefin, occurs to produce a higher molecular weight hydrocarbon. These reactions are known to be catalyzed to a greater or less extent by the so-called Friedel-Crafts type metal halide catalysts, among the better known of which may be mentioned aluminum chloride, aluminum bromide, boron fluoride, zinc chloride, ferric chloride, antimony trifluoride, zirconium tetrachloride, and other polyvalent metal halides, generally used in anhydrous form. Of these catalysts, aluminum chloride has to date received the greatest commercial acceptance due to its activity, relatively low cost, and availability. Such metal halide catalysts are also utilized to a great extent in a relatively large number of other reactions involving hydrocarbons and other organic materials, and such uses are now well known to the art.

In most cases the metal halide catalysts, as exemplified by aluminum chloride, are advantageously, and sometimes necessarily, activated with the corresponding anhydrous hydrogen halide or with other materials which provide the hydrogen halide under the conditions of reaction. The quantity of hydrogen halide required varies greatly in accordance with the reaction being catalyzed and may range from less than one percent of the metal halide up to much larger quantities, such as 50 to 100 percent. The hydrogen halides, being normally gaseous or highly volatile liquids, frequently are lost from the reaction system by leaks or by incorporation in various effluent streams, as well as by reacting with components of the reaction mixture, and such losses in many cases represent a substantial proportion of the chemical cost in a commercial plant.

In organic reactions utilizing anhydrous aluminum chloride or the like, the aluminum chloride can be charged to the process either as a solid, or as a slurry formed by dissolving and/or suspending a considerable amount of aluminum chloride in hydrocarbons or other suitable liquids. In any case a liquid sludge is formed after a short period of operation, the rate usually being more rapid when the reactants are in liquid phase, and the sludge, which at the outset is active as a catalyst, gradually becomes deactivated with use. Such sludges may comprise complexes of aluminum chloride with hydrocarbons or other organic materials, as well as dissolved or suspended free aluminum chloride. In a process in which a sludge forming catalyst is utilized a portion of the sludge must be periodically or continuously withdrawn and replaced with fresh aluminum chloride in order to maintain an economic level of catalytic activity. The utilization of such sludge to avoid wasting its aluminum chloride content would be of appreciable economic advantage and would also simplify the problems of sludge disposal. However, in spite of the obvious need for recovering such aluminum chloride, it has heretofore been customary to discard the sludge as waste material. Although a number of processes have been proposed for utilizing partially spent catalyst to effect further reactions or to recover valuable components, various drawbacks have prevented such processes from being brought into commercially active use.

I have found that the sludge formed in hydrocarbon conversion processes catalyzed by aluminum chloride hydrocarbon complex catalysts can be converted into an easily manageable, free-flowing, solid by partial hydrolysis of said sludge with finely divided water or steam under carefully controlled conditions. I have also found that by so carrying out the hydrolysis of said sludge a substantially anhydrous hydrogen halide can be recovered from the vaporous products of said hydrolysis.

It is an object of this invention to recover valuable components from metal halide sludges. A further object is to treat liquid sludges comprising Friedel-Crafts type metal halides in free and/or combined form in a simple but effective manner in order to recover the halogen content thereof. An additional object is to carry out organic conversions, and particularly hydrocarbon isomerizations and alkylations, in the presence of an aluminum halide catalyst, and to treat sludges derived therefrom to provide make-up hydrogen halide activator for said catalyst. Another object of the invention is to recover organic constituents from sludges of the type described in the form of useful products. Another object of this invention is to manufacture substantially pure hydrogen chloride. Further objects and advantages of the invention will be apparent, to one skilled in the art, from the accompanying disclosure and description.

Thus, according to the invention, there is provided a process for treating a Friedel-Crafts type metal halide sludge formed during the catalytic conversion of a hydrocarbon in the presence of a Friedel-Crafts type metal halide catalyst which comprises contacting said sludge in finely divided form in a treating zone with a hydrolyzing agent in an amount sufficient to effect only a partial hydrolysis of the metal halide in said sludge, and recovering a product of said hydrolysis from said treating zone. Products which can be recovered include a substantially anhydrous hydrogen halide which is recovered from the vaporous overhead products from said treating zone, and a dry, free-flowing, finely divided solid residue which is recovered from the bottom of said treating zone.

It is to be noted that only a partial hydrolysis of the metal halide contained in the sludge and/or catalyst is effected in my treating zone. My invention involves carrying out the hydrolysis under carefully controlled conditions so as to effect a degree of hydrolysis up to about 55 percent. It is preferred to carry out the hydrolysis reaction so that about 25 to 55 percent of the metal halide content of said sludge is hydrolyzed. For economic reasons it is more preferable to operate within the higher portion of said range, i. e., from about 40 to 55 percent hydrolysis.

An important advantage of the invention is that a substantially dry hydrogen halide can be recovered from the vaporous overhead product of the hydrolysis reaction. When only sufficient water or steam is used to obtain about 25 to 55 percent hydrolysis the hydrogen halide recovered will contain from about 0.5 to about 2.0 percent by weight water. When excess amounts of water or steam are employed the excess is removed overhead from the treating zone with the vaporous products of the reaction and an aqueous hydrogen halide is obtained. By controlling the degree of hydrolysis as set out above the substantially dry halogen halide recovered is, in many instances, sufficiently pure to be used as a catalyst activator for metal halide catalysts in hydrocarbon conversion processes. However in some instances it will be found preferable to pass the hydrogen halide through a contact drier before returning same to the hydrocarbon conversion zone.

Another important advantage of my invention is that the sludge is converted into a dry, easily manageable, free-flowing solid which is non-hygroscopic and which can be easily disposed of or further treated as desired.

The prior art is replete with processes for treating metal halide sludges formed during the catalytic conversion of hydrocarbons in the presence of metal halide catalyst. However, in none of these processes is only a partial hydrolysis of the sludge effected. Consequently few, if any, of said prior art processes have been successful to the extent of being practiced commercially. Prior to my invention it has been common practice to dispose of said sludges by various means such as the use of sludge pits, etc. Such practices have resulted in considerable economic waste. The process of my invention is applicable for the treatment of any metal halide sludge obtained from a conversion process wherein hydrocarbons are converted in the presence of a metal halide catalyst. Among such processes which are of particular importance today are the various alkylation and isomerization processes employing aluminum chloride as a catalyst. Due to the importance of said alkylation and isomerization processes, and for the sake of convenience, the invention will be further described as applied to said processes.

In a typical isomerization process a dry normal butane is passed at suitable temperatures and pressures over an aluminum chloride catalyst along with hydrogen chloride. As the isomerization reaction proceeds, a liquid aluminum chloride sludge is formed which contains considerable aluminum chloride. Ordinarily this sludge is withdrawn from the reaction chamber and discarded. In the practice of the present invention this sludge is withdrawn from the reaction chamber and passed to a hydrolysis zone wherein a partial hydrolysis is effected and valuable components of said sludge, including hydrogen chloride, are recovered. The recovered hydrogen chloride is recycled to the reaction chamber.

Herein and in the claims, unless otherwise specified, the word "sludge" is employed generically and includes, liquid metal halide-hydrocarbon complex catalyst containing sludge therein such as that employed in alkylation processes, and liquid sludge per se such as that which forms when a solid metal halide catalyst is employed as in some isomerization processes.

Referring now to the drawing the invention will be more fully explained as applied to the alkylation of isobutane with ethylene for the production of diisopropyl. Ethylene from line 10 together with isobutane from line 11, in a mol ratio of approximately 4.5 mols of isobutane to 1 mol of ethylene, are charged through line 12 into alkylator 13. A small amount of hydrogen chloride from line 14 is introduced along with said hydrocarbons. In alkylator 13 said hydrocarbons are intimately contacted with aluminum chloride hydrocarbon complex catalyst which enters said reactor through line 15. The alkylation reaction is conducted at a pressure sufficiently high to maintain all of the hydrocarbon in liquid phase, for example, at about 375 to 450 lbs. per square inch gage. A temperature of about 80 to about 150° F. is employed. The viscosity of said catalyst is usually maintained at about 200 to 350 centipoises at 100° F. The catalyst can be originally prepared by mixing aluminum chloride and kerosene in a weight ratio of about 8 to 5. During operation of the process the original complex catalyst is replaced with complex catalyst formed in the process and which contains aluminum chloride and hydrocarbon in a ratio of about 1 to 1. The viscosity of the catalyst and also the conversion of ethylene depend upon catalyst activity which can be maintained by adding make-up aluminum chloride via line 16. Make-up hydrogen chloride can be added through line 17. With an active catalyst, conversion of ethylene can be maintained within the desired range of 90 to 99 percent, preferably 97 to 99 percent. A catalyst ratio of about 1 volume of catalyst per 1.5 to 2 volumes of hydrocarbon is usually employed. Reaction mixture comprising unreacted hydrocarbons, alkylate, and catalyst phase is withdrawn from reactor 13 through line 18 and passed into settler 19 wherein a separation is effected between the hydrocarbon phase and the catalyst phase. Said hydrocarbon phase is removed via line 20 and introduced into fractionator 21 wherein propane and lighter materials are removed overhead via line 22 for further use as described hereinafter. If desired, said propane and lighter can be withdrawn through line 45. Bottoms product from fractionator 21 is withdrawn and passed via line 23 into fractionator 24 wherein unreacted isobutane is removed overhead and recycled via line 25 to the reaction zone. Raw alkylate is withdrawn from the bottom of fractionator 24 and passed via line 26 to further treatment and/or purification as desired.

The bottom layer in settler 19 comprises the aluminum chloride hydrocarbon complex catalyst which contains the sludge which has formed during the conversion reaction. Said bottom layer is withdrawn through line 27 and the greater portion thereof is recycled to the reaction zone. As mentioned, during the reaction in alkylator 13 the volume of the catalyst phase increases due to the formation of sludge. Therefore, it is necessary to withdraw a portion of said catalyst phase, intermittently or continuously, preferably continuously, so as to maintain the volume of the catalyst phase substantially constant. Fresh aluminum chloride is added to the circulating stream of catalyst so as to keep the activity of said catalyst at a suitably high level and to maintain the aluminum chloride content at about 50 to 70 percent by weight. Prior to my invention the withdrawn portion of the catalyst phase was usually discarded. In the practice of my invention said withdrawn portion is passed via pump 28 and line 29 through heater 30 and introduced into hydrolysis tower 31 as a finely divided spray by means of spray nozzles 32. In hydrolysis tower 31 said finely divided sludge is contacted countercurrently with finely divided water such as a fog or mist, or steam, introduced via line 32'.

It is to be noted that said sludge is sprayed into said water mist or steam. It is preferred that said water mist or steam be the "continuous" phase, rather than to disperse the water or steam into a body of liquid sludge.

Vaporous products of the hydrolysis reaction are withdrawn overhead from tower 31 through line 33. Said vaporous products which comprise hydrogen chloride, propane and/or butane, and small amounts of water, are introduced into fractionator 34. Substantially anhydrous hydrogen chloride (usually containing not more than 2 percent by weight water) is removed overhead from fractionator 34 via line 35, and recycled via lines 36, 14, and 12 to reaction zone 13. In some instances it will be desirable to pass said hydrogen chloride into contact drier 47 and remove the last traces of water prior to returning the hydrogen chloride to said reaction zone. In contact drier 47 said hydrogen chloride is dried by contacting same with a drying agent such as sulfuric acid, etc.

In hydrolysis tower 31 the partially hydrolyzed sludge settles to the bottom thereof and is withdrawn through conduit 37 for further treatment or use as desired. As previously mentioned said partially hydrolyzed sludge is a finely-divided, dry, free-flowing, easily handled material and can conveniently be transferred by conveyer means (not shown) from the outlet of conduit 37 for other use. In the handling of said partially hydrolyzed sludge it is advantageous to maintain the accumulation thereof in the bottom of hydrolysis tower 31 as a semi-fluidized bed. A fluidizing medium can be introduced through distributor 38 by means of line 39 to maintain said bed in a semi-fluidized condition. Said fluidizing medium can comprise the propane and lighter gases recovered overhead from fractionator 21 and introduced into line 39 by means of line 22. If desired, the light hydrocarbons removed as bottoms product from fractionator 34 via line 40 can be passed through heater 41 and utilized as said fluidizing medium; or, said light hydrocarbons from the bottom of fractionator 34 can be passed through line 46 to storage or other use. It is sometimes advantageous, depending upon the length of conduit 37, to "aerate" the partially hydrolyzed sludge flowing through said conduit 37. Lines 42 and 43 are provided for this purpose. The use of a fluidizing medium to maintain the accumulation of partially hydrolyzed sludge in the semi-fluidized condition has the further advantage that said fluidizing medium serves as a stripping medium to strip hydrogen chloride and hydrocarbons from said partially hydrolyzed sludge. If desired, suitable fluidizing medium from an outside source can be introduced into line 39 through line 43.

It is of course well known that aluminum chloride can be hydrolyzed with water to form hydrogen chloride and aluminum oxide. The exact nature of the physical changes, as opposed to the said chemical changes, which occur in the sludge being treated according to my invention is presently unknown. When aluminum chloride sludges are mixed with liquid water there is formed a heavy, tarry residue which fouls lines, pumps, and other equipment, and in some instances even sets to a solid in such equipment. In some instances when such sludges are contacted with liquid water excessive foaming takes place with the formation of an emulsion which is very difficult to break. It is presently believed that the successful operation of the process of my invention is due primarily to two features (1) the introduction of the sludge in a finely divided condition and (2) the introduction of said finely divided sludge into a "continuous" phase of finely divided water such as a fog or mist, or steam. A study of the prior are processes shows that at least one or both of these features is missing. Even though it is believed important that the finely divided water or steam, with which the dispersed sludge is contacted, should be the "continuous" phase it is again pointed out that only sufficient of said water or steam is used to partially hydrolyze said sludge. I have observed on numerous occasions that there is a tendency for the hydrolysis reaction to cease at about 50 to 55 percent hydrolysis. When sufficient of said water or steam is used to force the hydrolysis reaction further to completion said water or steam is removed overhead with the vaporous products of the reaction and aqueous hydrogen chloride is recovered therefrom.

The amount of water used in hydrolysis tower 31 can range from about 0.05 to about 0.25 lb. per hour per pound of sludge. It will of course be realized by those skilled in the art that the amount of water to be used will depend on the aluminum chloride or other metal halides content of the sludge and the amount of hydrolysis thereof it is desired to effect.

The temperature at which the sludge is introduced into hydrolysis tower 31 will depend upon the nature of the sludge being treated, the spraying characteristics of said sludge, and the type of spraying equipment employed. It is preferred to heat the sludge to a temperature within the range of about 250 to about 400° F. When steam is employed as the hydrolyzing medium it is usually introduced at a temperature within the range of 225 to 325° F. When water is employed as the hydrolyzing medium it is introduced as a finely divided mist or fog employing any of the several well known fog nozzles which are available commercially. It is not necessary to preheat the water. It should be realized that the temperature at which the sludge is introduced is not necessarily the temperature at which the hydrolysis reaction is carried out. Said hydrolysis reaction is highly exothermic and temperatures in the zone wherein the reaction is actually taking place may approach 600° F. or even higher.

The pressure within hydrolysis tower 31 is usually within the range of 0 to 50 p. s. i. g. However, pressure is not a limitation upon the process of the invention. The process can be carried out at higher pressures in suitable equipment. The pressure at which said sludge is introduced into hydrolysis tower 31 will of course depend upon the particular type of spray nozzles or spraying equipment employed.

The process of the invention is not to be limited to any particular type of apparatus. Any suitable apparatus can be employed.

The following examples will further illustrate the invention.

EXAMPLE I

A spent aluminum chloride sludge from the alkylation of isobutane with ethylene as described above, containing approximately 57.5 weight percent inorganic material and complexed with 42.5 weight percent hydrocarbon was heated to 250° F. and was sprayed downwardly at a rate of 125 lbs. per hour into the upper portion and near the top of a 6 ft. spray tower having a diameter of 10 inches, utilizing a Fulljet No. 2 nozzle. The nozzle was maintained at a spray angle of 50 degrees and had a 0.052 inch orifice. The spraying pressure was 45 p. s. i. g. The particular nozzle employed is sold by Spraying Systems Company, Chicago, Illinois, as shown in their catalog No. 22, page 6. Steam at 250° F. was introduced at the rate of 14.5 lbs. per hour near the bottom of the tower countercurrent to the descending particles of sludge. A pressure within the range of 0 to 2 p. s. i. g. was maintained in the tower. The temperature in the reaction zone was not determined but was known to be above 300° F. From the bottom of the spray tower there was removed a dry, finely-divided, free-flowing solid, having a bulk density of about 7 lbs. per cu. ft., which was non-hygroscopic and which could be easily handled in open shipment for an indefinite time without gumming or caking. Hydrolysis of the sludge was 32 percent (by weight) complete.

The gaseous mixture removed overhead from the tower was fractionated to provide a 98 plus weight percent hydrogen chloride at a rate of 19 lbs. per hour.

EXAMPLE II

In another run utilizing the same equipment as in Example I, a more viscous sludge was heated to 285° F. and sprayed at a rate of 56 lbs. per hour as described in Example I. The spraying pressure was 20 p. s. i. g. Steam was introduced near the bottom of the tower countercurrently at 260° F. at a rate of 8.5 lbs. per hour. The solid product removed from the bottom of the tower was similar to that obtained in Example I. Hydrolysis of the sludge was approximately 45 percent complete. Hydrogen chloride was produced in the overhead gas stream at the rate of 16 lbs. per hour.

Table I given below summarizes the results obtained in the above examples. In said table runs 1 and 2 correspond to Examples I and II respectively. In addition to said runs 1 and 2, the results from 3 other runs, carried out in a manner similar to that of Examples I and II, are also summarized.

*Table 1.—Summary of data and results from partial hydrolysis of spent aluminum chloride sludge containing catalyst*

| Run Number | 1 | 2 | 3 | 4 | 5 |
|---|---|---|---|---|---|
| Sludge Rate, lb./hr | 125 | 56 | 156 | 133 | 65 |
| Water Rate, lb./hr | 14.5 | 8.5 | 7.6 | 8.9 | 8.7 |
| HCl Produced (Est.), lb./hr | 19 | 16 | | 31 | 28 |
| Percent Hydrolysis of Sludge [a] | 32 | 45.5 | | 29 | 53 |
| Temperature, °F.: | | | | | |
|   Sludge Feed | 250 | 285 | 220 | 220 | 280 |
|   Steam In | 250 | 260 | 244 | 255 | 265 |
|   Reaction Level | >300 | 410 | 390 | 380 | 405 |
|   Gaseous Product | >300 | >300 | 280 | 275 | 295 |
| Pressure, p. s. i. g.: | | | | | |
|   Feed Pump | 45 | 20 | 70 | 60 | 60 |
|   Top Tower | 0 | 0 | 2.75 | 2.5 | 2.5 |
| Gaseous Product Analysis, Wt. Percent [b]: | | | | | |
|   HCl | 72 | 68 | 58 | 62 | 69 |
|   $H_2S$ | 1.5 | 1.5 | 0.7 | 0.5 | 0.7 |
|   $H_2O$ | 1.5 | 1.5 | 0.5 | 0.5 | 2.0 |
|   $C_4+$ Hydrocarbons | 25 | 29 | 38 | 26 | 28 |

[a] Determined by chloride determination before and after treatment.
[b] Analysis was by mass spectrograph.

As will be evident to those skilled in the art in view of the above discussion various modifications of the invention can be made without departing from the spirit or scope of said disclosure and discussion, or from the scope of the claims.

I claim:

1. A process for treating a Friedel-Crafts type metal halide sludge formed during the catalytic conversion of hydrocarbons in the presence of a Friedel-Crafts type metal halide catalyst which comprises: introducing said sludge in finely divided liquid form into an upper portion of a treating zone; introducing a hydrolyzing agent selected from the group consisting of finely divided water and steam into an intermediate portion of said treating zone so as to effect intimate contact between descending particles of said sludge and ascending particles of said hydrolyzing agent, said hydrolyzing agent being the continuous phase in said treating zone and present in an amount sufficient to effect only a partial hydrolysis of the metal halide contained in said sludge; withdrawing vaporous products of said hydrolysis reaction overhead from said treating zone; recovering substantially anhydrous hydrogen halide from said vaporous products; accumulating a free-flowing, finely-divided, partially hydrolyzed solid in the lower portion of said zone; introducing light hydrocarbon vapor as a stripping medium into the lower portion of said zone in an amount sufficient to maintain said partially hydrolyzed solid in a semi-fluidized state; and withdrawing a stripped, free-flowing partially hydrolyzed solid from the lower portion of said zone.

2. The process of claim 1 wherein said hydrolyzing agent is finely divided water.

3. The process of claim 1 wherein said hydrolyzing agent is steam.

4. The process of claim 1 wherein said metal halide catalyst is aluminum chloride and said hydrogen halide is hydrogen chloride.

5. The process of claim 1 wherein the metal halide contained in said sludge is hydrolyzed to an extent within the range of 25 to 55 percent by weight.

6. The process of claim 3 wherein said metal halide catalyst is aluminum chloride, said hydrogen halide is hydrogen chloride and said steam is added to said treating zone in an amount within the range of 0.05 to 0.25 pound per hour per pound of sludge charged to said treating zone.

7. The process of claim 1 wherein said light hydrocarbon vapor introduced into the lower portion of said treating zone is a hydrocarbon vapor recovered from said vaporous overhead products from said treating zone.

8. In a hydrocarbon conversion process wherein, a hydrocarbon feed is contacted with a Friedel-Crafts type metal halide catalyst in a conversion zone under conditions effecting conversion of said hydrocarbon feed, said catalyst forms a sludge during said conversion, and hydrocarbon effluent from said conversion zone is fractionated to yield a stream comprising $C_3$ hydrocarbons and lighter, the improvement which comprises: passing at least a portion of said sludge to a treating zone and therein contacting same, in finely divided liquid form, countercurrently with a hydrolyzing agent selected from the group consisting of water mist and steam in an amount sufficient to effect only a partial hydrolysis of the metal halide contained in said sludge; withdrawing vaporous products of said hydrolysis reaction overhead from said treating zone; recovering substantially anhydrous hydrogen halide from said vaporous products; accumulating a free-flowing, finely divided, partially hydrolyzed sludge in the lower portion of said treating zone; introducing at least a portion of said $C_3$ hydrocarbon and lighter stream, in vapor form, into the lower portion of said treating zone in an amount sufficient to maintain said partially hydrolyzed sludge in a semi-fluidized state; withdrawing free-flowing, partially hydrolyzed sludge from the lower portion of said treating zone; and returning said substantially anhydrous hydrogen halide to said conversion zone as an activator for said catalyst.

References Cited in the file of this patent

UNITED STATES PATENTS

| | | |
|---|---|---|
| 1,760,962 | Phillips et al. | June 3, 1930 |
| 1,865,797 | Shiffler | July 5, 1932 |
| 1,967,235 | Ferkel | July 24, 1934 |
| 2,366,372 | Voorhees | Jan. 2, 1945 |
| 2,486,485 | Latchum | Nov. 1, 1949 |
| 2,518,307 | Groebe | Aug. 8, 1950 |
| 2,689,823 | Hardy et al. | Sept. 21, 1954 |